United States Patent
Svedman

(10) Patent No.: US 9,480,032 B2
(45) Date of Patent: Oct. 25, 2016

(54) TRACKING RECEIVED POWER IN WIRELESS COMMUNICATIONS

(71) Applicant: ZTE Wistron Telecom AB, Stockholm (SE)

(72) Inventor: Patrick Svedman, Stockholm (SE)

(73) Assignee: ZTE Wistron Telecom AB, Stockholm (SE)

( * ) Notice: Subject to any disclaimer, the term of this patent is extended or adjusted under 35 U.S.C. 154(b) by 0 days.

(21) Appl. No.: 14/652,450

(22) PCT Filed: Dec. 13, 2013

(86) PCT No.: PCT/SE2013/051507
§ 371 (c)(1),
(2) Date: Jun. 15, 2015

(87) PCT Pub. No.: WO2014/098737
PCT Pub. Date: Jun. 26, 2014

(65) Prior Publication Data
US 2015/0319720 A1 Nov. 5, 2015

Related U.S. Application Data

(60) Provisional application No. 61/738,232, filed on Dec. 17, 2012.

(51) Int. Cl.
*H04B 7/00* (2006.01)
*H04B 1/00* (2006.01)
(Continued)

(52) U.S. Cl.
CPC ........... *H04W 52/52* (2013.01); *H04B 17/309* (2015.01); *H04B 17/318* (2015.01); *H04L 5/0048* (2013.01); *H04L 27/26* (2013.01); *H04W 72/0406* (2013.01)

(58) Field of Classification Search
CPC .................................................... H04W 52/52

USPC ......................................................... 455/522
See application file for complete search history.

(56) References Cited

U.S. PATENT DOCUMENTS

| 6,735,420 B2* | 5/2004 | Baldwin | H04W 52/267 455/115.1 |
| 2003/0114127 A1* | 6/2003 | Baldwin | H04W 52/267 455/245.1 |

(Continued)

FOREIGN PATENT DOCUMENTS

| EP | 1 191 804 A2 | 3/2002 |
| EP | 2 472 806 A1 | 7/2012 |
| WO | 2008/112849 A2 | 9/2008 |

OTHER PUBLICATIONS

International Search Report and Written Opinion mailed on Apr. 10, 2014 for International Application No. PCT/SE2013/051507, filed Dec. 13, 2013 (14 pages).

(Continued)

*Primary Examiner* — Tilahun B Gesesse
(74) *Attorney, Agent, or Firm* — Perkins Coie LLP

(57) ABSTRACT

A plurality of signal transmissions, transmitted using a plurality of transmit powers, are received at a receiver over a communication channel. Each transmit power shares a common transmit power term unknown to the receiver and a signal-specific power offset known to the receiver. The received power is measured at the receiver. A corresponding known power offset is subtracted from the measured received signal power, resulting in a corresponding estimate of the common unknown power term. This results in a plurality of estimates of the common transmit power term. A refined common transmit power term is estimated from the plurality of estimates of the common transmit power term. A plurality of refined measured received signal powers are estimated by adding the plurality of signal-specific power offsets to the refined common power term. Based on the refined common transmit power term, a functionality of the wireless communication system is adapted.

29 Claims, 5 Drawing Sheets

(51) Int. Cl.
  *H04B 1/04* (2006.01)
  *H04W 52/52* (2009.01)
  *H04L 5/00* (2006.01)
  *H04L 27/26* (2006.01)
  *H04W 72/04* (2009.01)
  *H04B 17/309* (2015.01)
  *H04B 17/318* (2015.01)

(56) References Cited

U.S. PATENT DOCUMENTS

| | | | |
|---|---|---|---|
| 2004/0203968 A1 | 10/2004 | Gopalakrishnan et al. | |
| 2005/0130662 A1* | 6/2005 | Murai | H04J 11/004 455/444 |
| 2008/0130723 A1* | 6/2008 | Lee | H04W 56/0045 375/211 |
| 2011/0050339 A1* | 3/2011 | Ohkawara | H03F 1/3294 330/149 |
| 2013/0287135 A1* | 10/2013 | Cheng | H04B 17/318 375/285 |

OTHER PUBLICATIONS

3GPP Technical Specification, "3rd Generation Partnership Project; Technical Specification Group Radio Access Network; Evolved Universal Terrestrial Radio Access (E-UTRA); Physical layer procedures (Release 10)," TS 36.213 v 10.6.0, 125 pages, Jun. 2012.

Sternad, M., et al., "Channel Estimation and Prediction for Adaptive OFDM Downlinks," IEEE 58th Vehicular Technology Conference, VTC 2003-Fall, vol. 2, pp. 1283-1287, Oct. 2003.

Wong, I.C., et al., "Low-Complexity Adaptive High-Resolution Channel Prediction for OFDM Systems," IEEE Global Telecommunications Conference, Globecom '06, San Francisco, California, pp. 1-5, Nov./Dec. 2006.

* cited by examiner

TRACKING RECEIVED POWER IN WIRELESS COMMUNICATIONS

CROSS REFERENCE TO RELATED APPLICATIONS

This patent document claims the benefit of priority of U.S. Provisional Patent Application No. 61/738,232, filed on Dec. 17, 2012. The entire content of the before-mentioned patent application is incorporated by reference as part of the disclosure of this application.

BACKGROUND

This document relates to wireless communication techniques and devices in cellular communication systems.

Cellular communication systems provide wireless communication services, including, e.g., voice services, mobile broadband data services and multimedia services. There is a growing need for cellular bandwidth due to various factors, including the continuous increase in the number of mobile phones such as smartphones that are coming on line and deployment of new mobile applications that consume large amounts of data, e.g., mobile applications in connection with video and graphics. As mobile system operators add new mobile devices to the network, deploy new mobile applications and increase the geographic areas covered by broadband mobile services, there is an ongoing need to cover the operator's coverage area with high bandwidth connectivity. One way for meeting such high bandwidth connectivity is to deploy heterogeneous networks where one or more low-power nodes are deployed at least partially within the coverage area of a macro base station operating at a higher transmission power.

SUMMARY

Receivers of wireless transmissions estimate power of a received signal of interest to improve efficiency of operation including, e.g., automatic gain control (AGC), estimating channel characteristics, reducing interference from or to other wireless equipment, and so on. The techniques disclosed in this document can be used to improve accuracy of power estimation and reduce computational complexity, among other benefits.

In one aspect, methods and apparatus are disclosed for using power estimation to improve wireless system performance. A plurality of signal transmissions are received at a receiver over a communication channel. The plurality of signal transmissions are transmitted using a plurality of transmit powers, each transmit power sharing a common transmit power term unknown to the receiver and a plurality of signal-specific power offsets known to the receiver. The received power is measured at the receiver. A corresponding known power offset is subtracted from the measured received signal power, resulting in a corresponding estimate of the common unknown power term, thereby resulting in a plurality of estimates of the common transmit power term. A refined common transmit power term is estimated from the plurality of estimates of the common transmit power term. A plurality of refined measured received signal powers are estimated by adding the plurality of signal-specific power offsets to the refined common power term. Based on the refined common transmit power term, a functionality of the wireless communication system is adapted.

These and other aspects, and their implementations and variations are set forth in the drawings, the description and the claims.

DETAILED DESCRIPTION

Figure 1:
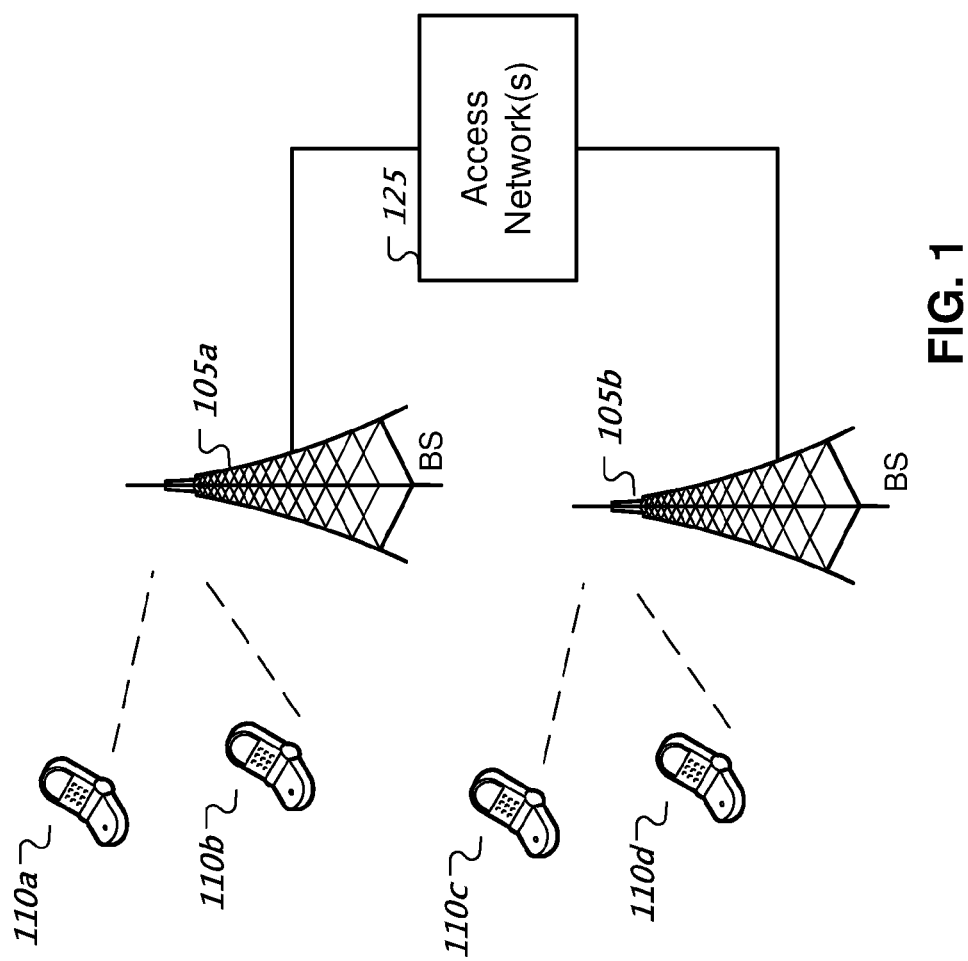
FIG. 1 depicts a wireless network configuration.

A wireless communication receiver can measure the power of a received signal. The power measurements may be performed for a variety of reasons such as gain control, channel estimation, transmission parameter adjustment, and so on. The power estimation is typically performed using separate power estimation mechanisms corresponding to different physical communication channels on which signals are received. In many wireless communications systems, several physical communication channels are used both in the uplink and downlink directions. The present document provides several techniques for identifying computations and estimations that are shared in common by the various physical channels. Using this information, complexity or received power estimation can be reduced and received power estimation can also be made more accurate.

The present document discloses power estimation techniques that can be implemented at a receiver of a wireless communication signal to improve the operation of a wireless communication system. The disclosed power estimation techniques exploit commonalities in received signal transmissions to improve received power estimation. The improved received power estimation can in turn be used to more accurately estimate the communication channel. As further described below, the received power of many communication signals can be shown to have contributions from a known term and an unknown term. The unknown term may change over a period of time. The unknown term may be related to instantaneous channel characteristics. A receiver can receive two or more different types of signal transmissions from a single transmitter that use different time slots or frequency resources (e.g., different subcarriers in an orthogonal frequency domain multiplexing, or OFDM, system). The receiver can improve the received signal power estimate by either independently using, or by using in combination, the unknown term estimated from the different types of signal transmissions. These and other techniques and benefits are further disclosed in this document.

In a radio communication link there is a transmitter and a receiver. In the transmission of a signal, the transmitter transmits at a transmit power, which is limited by the maximum transmit power of the transmitter. The transmitter may use different transmit power levels to transmit signals depending on the type or kind of a particular signal that is transmitted. For example, two different kinds of signals may be a signal containing unknown data and a pilot signal (a known signal). The transmit power levels of different kinds of signal may vary with time, depending on various factors.

The signals may be transmitted through one or several transmit antennas of the transmitter.

It may be useful for the receiver to track the received power of the different kinds of received signals over time. It is assumed that the receiver knows which kind of signals that are transmitted and that the receiver can distinguish these signals. The receiver may track the powers of the signals received in one receive antenna or the powers of the signals combined from multiple receive antennas. The tracked received powers can be used for various purposes, for example, to assist the data reception, to issue power control commands to the transmitter, to predict a received power level and to schedule different transmitters in a cellular communication system.

In certain wireless networks, various signals are transmitted using different physical transmission channels. For example, transmissions in the uplink directions from a user equipment (UE) such as a mobile device to the network and the downlink directions from the network to UEs occur on different physical transmission channels. In operation, the channels may be "symmetric" in that the uplink and the downlink physical transmission channels may have same or similar frequency responses. As another example of physical transmission channels, when multi-carrier communication such as orthogonal frequency domain multiplexing is used, a physical channel may correspond to a combination of time-frequency resources assigned for transmissions. As an example, the Long Term Evolution (LTE) system defines various physical communication channels such as physical hybrid automatic repeat request indication channel (PHICH) and physical uplink shared data channel (PUSCH) in the uplink direction or physical downlink shared channel (PDSCH) and physical downlink control channel (PDCCH), etc.

FIG. 1 shows an example of a wireless communication system. A wireless communication system can include one or more base stations (BSs) 105a, 105b that are coupled to form an access network 125 to provide wireless services to one or more wireless devices 110. Base station 105a, 105b are placed at different locations in the wireless service area to divide the service area into cells and can provide wireless service to wireless devices 110. In some implementations, a base station (e.g., 105a or 105b) includes directional antennas to produce two or more directional beams to provide wireless coverage in different sectors within a cell.

The access network 125 having one or more base stations 105a, 105b, in some implementations, may be in communication with a core network (not shown in FIG. 1) that provides connectivity with other wireless communication systems and wired communication systems. The core network may include one or more service subscription databases to store information related to the subscribed wireless devices 110. In some systems, different base stations may operate based on different wireless radio access technologies. In FIG. 1, for example, the first base station 105a may be configured to provide wireless service based on a first radio access technology, whereas the second base station 105b may be configured to provide wireless service based on a second radio access technology different from the first radio access technology. The base stations 105a may be co-located or may be separately installed in the field according to the deployment scenario. In such a configuration, the access network 125 can support multiple different radio access technologies.

Various examples of wireless communication systems and access networks that can implement the present techniques and systems include, among others, wireless communication systems based Code Division Multiple Access (CDMA) such as CDMA2000 1×, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO). For CDMA200 systems, the core network 125 can include, among others, mobile switching center (MSC), Packet Data Serving Node (PDSN) and others.

Figure 2:
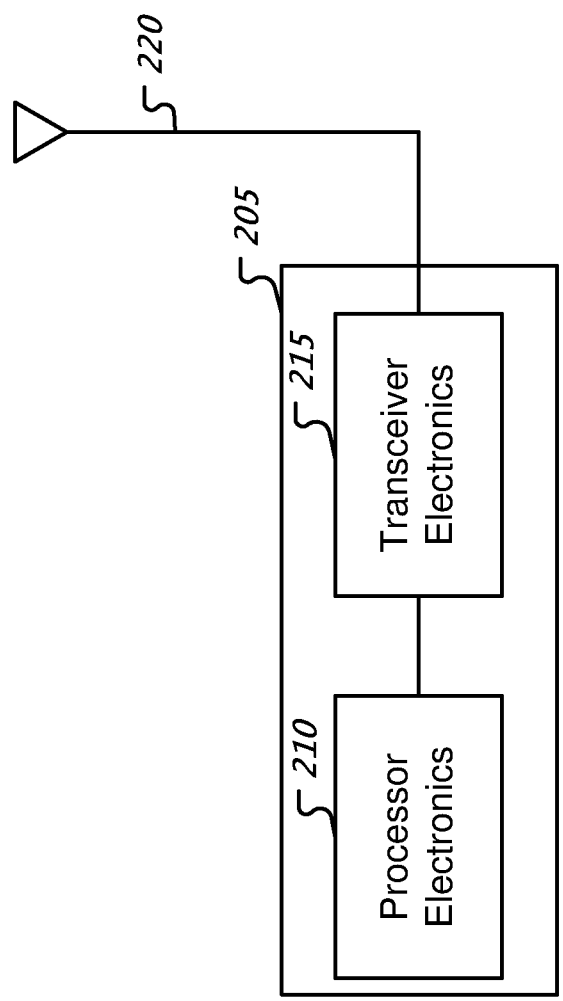
FIG. 2 depicts a radio station architecture.

FIG. 2 is a block diagram representation of a portion of a radio station 205 which can be a base station or a wireless device. The radio station 205 includes processor electronics 210 such as a microprocessor that implements one or more of the wireless communications techniques presented in this document. The radio station 205 further includes transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215. While in FIG. 2, for simplicity, antenna 220 is depicted as a single element. However, in some configurations, the radio station 205 may comprises multiple antennae, as further described in this document.

In some implementations, radio stations 205 can communicate with each other based on a CDMA air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA such as CDMA2000 1×, HRPD, WiMAX, LTE, and Universal Mobile Telecommunications System (UMTS), 3G, 4G and other current and upcoming wireless technologies.

In general, the power attenuation experienced by a signal from the transmission point to the reception point could be due to a combination of different physical attributes. For example, the signal may suffer attenuation through the propagation medium (e.g., air). The signal may also change spectral characteristics due to the communication channel, thereby changing the amount of power in a given frequency band. The signal may also experience attenuation through components in the receive chain (e.g., radio frequency front end). Furthermore, different signals may experience different attenuations, based on the spectral occupancy of the signals and time varying nature of the transmission channel. The received signals of all kinds in this set can be used as input to the tracking. This increased amount of observations can help improve the tracking accuracy for all signals in the set. For example, in OFDM transmissions, such as performed in LTE, two different signal transmissions in a given time slot will occupy different subcarriers and thus may experience different physical channel characteristics. However, the signal attenuation, or conversely received signal power, could be modeled by identifying commonly shared attenuation characteristics of these different physical transmissions.

The techniques disclosed in the present document are useful, in one aspect, to improve the received power tracking accuracy.

In some embodiments, all received signals may be divided into different logical sets. Signals included in a given set may have the same term that is unknown to the receiver, in which the tracking is done. The signals in different sets may have different known power offsets.

The received power estimates are normalized into a common normalized power variable by removing the known power offset. This common variable is tracked. The improved estimates and predictions can be obtained be added the known power offset to the output of the tracking.

In the description below, the Long Term Evolution (LTE) wireless communication standard is used for illustrative purpose only and the techniques discussed are also applicable to other wireless communication technologies.

In some embodiments of LTE, the tracking of PUSCH and/or SRS received power in LTE may be performed. These two kinds of signals share a common power term, which is based on the estimated downlink pathloss as estimated by the UE. These two kinds of signals have different known power offsets, which may vary with time due to for example power control commands and transmission bandwidth.

The transmit powers of M different types of signal transmissions that the transmitter may transmit can be written on the form $$P_m^{Tx}(t) = P^{unknown}(t) + P_m^{known}(t) \quad \text{Eq. (1)}$$

$P_m^{Tx}(t) = P^{unknown}(t) + P_m^{known}(t)$ where $m \subset [1, \ldots, M]$ is the index of the signal among the M kinds of signals, t is a time variable, $P^{unknown}(t)$ is a term that is unknown to the receiver, but equal for all M signals, and $P_m^{known}(t)$ is a term that is known to the receiver. The radio signal powers in described examples are in dB scale, unless otherwise noted. As previously stated, the unknown power term is equal for all M signals. At a specific time instant $t_1$, none, some, or all of the M kinds of signals may be transmitted. The transmitter may also transmit multiple signals of the same kind at the same time, e.g., by using different subcarriers in a multi-carrier transmission scheme such as OFDM.

One illustrative example is an LTE network, where a transmitter (UE) may transmit the following signals:
  PUSCH (Physical Uplink Shared Channel) without a simultaneous Physical Uplink Control Channel (PUCCH) transmission and SRS (Sounding Reference Signal).

Similarly, in the case of LTE downlink, the eNodeB may transmit the following signals:
  PDCCH (Physical downlink control channel) and CRS (common reference signal).

In the example of uplink transmissions, for Eq. (1), M=2, with m=1 corresponding to PUSCH and m=2 corresponding to SRS.

Without a simultaneous PUCCH transmission, the UE's transmit power (i.e., the power level at which the UE is to transmit) for PUSCH in sub-frame t for cell c is given by (in dBm):

$$P_{1,c}^{Tx}(t) = 10 \log_{10} M_{1,c}(t) + P_{1,c}^{o}(j) + \alpha_c(j) PL_c + \Delta_{TF,c}(t) + f_c(t) + \bar{\theta}(PH_{1,c}(t)) \quad \text{Eq. (2)}$$

where $M_{1,c}(t)$ is the PUSCH bandwidth in resource blocks in subframe t for cell c, and $P_{1,c}^{o}(j)$ is a power offset for PUSCH provided by the network. For PUSCH (re)transmissions corresponding to a semi-persistent grant, j=0, for PUSCH (re)transmissions corresponding to a dynamic scheduled grant, j=1 and for PUSCH (re)transmissions corresponding to the random access response grant, j=2. In addition, $\alpha_c(j)$ is a parameter provided by the network, with $\alpha_c(0) = \alpha_c(1)$. The parameter may be provided a priori or by a higher layer message. $PL_c$ is the estimated downlink pathloss for cell c. Parameter $\Delta_{TF,c}(t)$ is a power offset for PUSCH provided by the network. Parameter $f_c(t)$ is a power offset provided by the network. Parameter $\bar{\theta}(x)$ is the inverse step function (=0 if x>0, else=1). Parameter $PH_{1,c}(t)$ is the PUSCH power headroom in subframe t for cell c, based on a reported value by the UE to the network.

The cell index c can for example be used denote a carrier in carrier aggregation. A cell index c can also correspond to multiple carriers. The estimated downlink pathloss $PL_c$ typically changes only slowly with time, i.e. barely from subframe to subframe.

In some implementations, of the terms in Eq. (2), the following terms are known by the network (i.e., at the receiver of the transmission): $10 \log_{10} M_{1,c}(t)$, $P_{1,c}^{o}(j)$, $\Delta_{TF,c}(t)$, $f_c(t)$, and $\bar{\theta}(PH_{1,c}(t))$. The term $\alpha_c(j) PL_c$ is not known by the network (i.e., the receiver). This means that for PUSCH (m=1), $$P_1^{known}(t) = 10 \log_{10} M_{1,c}(t) + P_{1,c}^{o}(j) + \Delta_{TF,c}(t) + f_c(t) + \bar{\theta}(PH_{1,c}(t)) \quad \text{Eq. (3)}$$

$$P^{unknown}(t) = \alpha_c PL_c \quad \text{Eq. (4)}$$

where $\alpha_c = \alpha_c(0) = \alpha_c(1)$.

Similar to the PUSCH transmit power, the SRS transmit power in sub-frame t for cell c is given by (in dBm):

$$P_{2,c}^{Tx}(t) = 10 \log_{10} M_{2,c}(t) + P_{2,c}^{o} + \alpha_c PL_c + f_c(t) + \bar{\theta}(PH_{2,c}(t)) \quad \text{Eq. (5)}$$

where
  $M_{2,c}(t)$ is the SRS bandwidth in resource blocks in subframe t for cell c.
  $P_{2,c}^{o}$ is a power offset for SRS provided by the network.
  $\alpha_c = \alpha_c(0) = \alpha_c(1)$ is a parameter provided by the network.
  $PL_c$ is estimated downlink pathloss for cell c
  $f_c(t)$ is a power offset provided by the network.
  $PH_{2,c}(t)$ is the SRS power headroom in subframe t for cell c, based on a reported value by the UE to the network.

Note that several of the parameters are identical to as used and described in Eq. (2).

Similar to the discussion above, the following terms are known by the network (i.e. the receiver):

$10 \log_{10} M_{2,c}(t)$ $P_{2,c}^{o}(j)$ $f_c(t)$ $\hat{\theta}(PH_{2,c}(t))$

The following term is not known by the network (i.e. the receiver)

$\alpha_c PL_c$

This means that for SRS (m=2), $$P_2^{known}(t) = 10 \log_{10} M_{2,c}(t) + P_{2,c}^{o}(j) + f_c(t) + \bar{\theta}(PH_{2,c}(t)) \quad \text{Eq. (6)}$$

and $$P^{unknown}(t) = \alpha_c PL_c \quad \text{Eq. (7)}$$

Comparing Eq. (7) with Eq. (4), it can be seen that $P^{unknown}(t)$ is equal for both PUSCH (without a simultaneous PUCCH transmission and j=0 or 1) and SRS. This means that these two signals follow the general model in Eq. (1).

In general, a signal of kind m is transmitted with power $P_m^{Tx}(t)$ at time t, with $m \in \{1, \ldots, M\}$. Before reaching the receiver, it is attenuated by A(t) dB. Hence, the received signal power is (in dBm):

$$P_m^{Rx}(t) = P_m^{Tx}(t) - A(t) \qquad \text{Eq. (8)}$$

For wideband signals, these powers and the attenuation may refer to the averages across the wide band, or to the powers and attenuation for a narrow band within the wide band.

The powers and the attenuation may refer to fast temporal variations due to fast transmit power variations and fast radio channel fading. The powers and the attenuation may also refer only to slow temporal variations, due to slow changes in transmit power and slow radio channel fading (large scale fading). For the latter case (slow variations), they may follow the slowly changing time-average of the fast temporal variations.

The term radio channel fading may include other time-varying factors like non-uniform antenna gain and time-varying transmitter and receiver characteristics. In a typical wireless network, the receiver knows or can detect the kinds of signals that are transmitted at a time t.

In the example of an LTE implementation, the average received power for PUSCH (without a simultaneous transmission and j=0 or 1) and SRS in subframe t and for cell c is given by:

$$P_{m,c}^{Rx}(t) = P_{m,c}^{Tx}(t) - PL_c^{UL}(t) \qquad \text{Eq. (9)}$$

with m=1 corresponding to PUSCH and m=2 corresponding to SRS. Hence, in this example M=2. The uplink pathloss $PL_c^{UL}(t)$ (slow radio channel fading) is an average over the frequency band used for cell c and over temporally fast fading and therefore changes slowly.

Let $\hat{P}_m^{Rx}(t)$ denote the estimated power at time t of a received signal of the mth kind in the receiver. The estimate may for example be corrupted by an additive estimation noise $n_m(t)$:

$$\hat{P}_m^{Rx}(t) = P_m^{Rx}(t) + n_m(t) \qquad \text{Eq. (10)}$$

Note that the estimation of $\hat{P}_m^{Rx}(t)$ is based on a signal of kind m, for example using standard signal power estimation methods. The receiver can operate to determine the normalized power $$\bar{P}_m^{Rx}(t) = \hat{P}_m^{Rx}(t) - P_m^{unknown}(t) = P^{unknown}(t) - A(t) + n_m(t) = C(t) + n_m(t) \qquad \text{Eq. (11)}$$

where $C(t) = P^{unknown}(t) - A(t)$ denotes a term common among the M kinds of signals. In some embodiment, it can be assumed that $P^{unknown}(t)$ is equal for the M kinds of signals.

Based on the received signals of the M kinds, the underlying variable C(t) can be tracked over time. The tracking can include various adaptive filtering or data fusion algorithms (e.g., Kalman filtering) that are not discussed here for brevity. Note that the estimation noise $n_m(t)$ may have different properties (for example statistical properties like variance) for different m and t. The receiver may be able to estimate these properties and use them to improve the tracking of C(t). In some embodiments, it is likely that the performance of tracking C(t) is superior to the performance of the tracking the individual $P_m^{Rx}(t)$. The reason is that the observations of $P_m^{Rx}(t)$ for all M kinds of signals can be combined in the tracking of C(t).

Let $\hat{C}(t)$ denote the tracked value C(t). Then the corresponding tracked received power for a signal of kind m can be computed as $$\tilde{P}_m^{Rx}(t) = \hat{C}(t) + P_m^{known}(t) \qquad \text{Eq. (12)}$$

For example, it may be possible that the tracked $\hat{C}(t) = C(t)$. Under this condition, the following condition is met:

$$\begin{aligned}\tilde{P}_m^{Rx}(t) &= C(t) + P_m^{known}(t) \\ &= P^{unknown}(t) - A(t) + P_m^{known}(t) \\ &= P_m^{Tx}(t) - A(t) \\ &= P_m^{Rx}(t)\end{aligned} \qquad \text{Eq. (13)}$$

As such, the received power is tracked perfectly. In typical implementations, it is likely that $\tilde{P}_m^{Rx}(t)$ is a more accurate estimate/prediction of $P_m^{Rx}(t)$ than $\hat{P}_m^{Rx}(t)$.

The tracking of C(t) may also include prediction, for example predicting $C(t+\Delta t)$. Therefore, the received power for a signal of kind m can be predicted as $$\tilde{P}_m^{Rx}(t+\Delta t) = \hat{C}(t+\Delta t) + P_m^{known}(t+\Delta t) \qquad \text{Eq. (14)}$$

where is is assumed that the known power offset at time $t+\Delta t$ is known.

Figure 3:
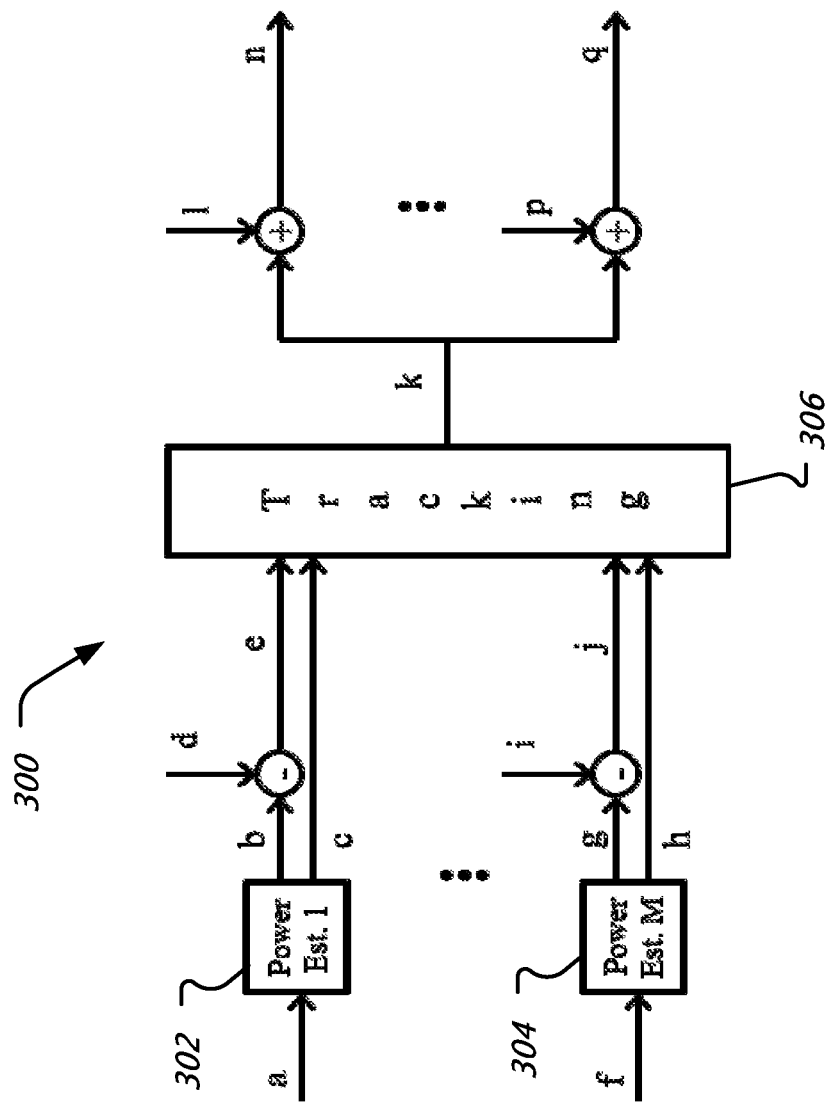
FIG. 3 is a block diagram of a power tracking configuration.

FIG. 3 shows an example of a power tracking device 300 in the receiver. The device 300 includes power estimation functions 302, 304 that are used to perform calculations and provide inputs to a power tracking function 306, as further described below. The letters in the figure correspond to the following variables:
  a: a signal of kind m=1.
  b=$\hat{P}_1^{Rx}(t)$: the estimated power of signal a.
  c: known or estimated properties of $n_1(t)$.
  d=$P_1^{known}(t)$: the known power offset of signal a.
  e=$\bar{P}_1^{Rx}(t)$: the normalized power of signal a.
  f, g, h, i, j: the same as a, b, c, d, e, but for a signal of kind m=M.
  k=$\hat{C}(t)$: the tracked common variable.
  l: the same as d.
  n=$\tilde{P}_1^{Rx}(t)$: the resulting tracked power of a signal of kind m=1 at time t.
  p, q: the same as l, n, but for a signal of kind m=M.

Note that when there are M different signal types being processed, there can be M corresponding power estimators 302, 304, where M is a positive integer.

In operation, a receiver receives signals of different kinds, possibly at different times, transmitted by the transmitter. These signals are in general transmitted on different physical communication channels and are received at a power level that is unknown the receiver. However, the received power level may have an unknown component and a known component (both having gone through some attenuation over the transmission channel).

FIG. 3 reflects a configuration in which the received signals are of one of the M kinds (e.g. a or f in FIG. 3). In that case, the power of the signal (b or g in FIG. 3) is estimated as well as the properties of the estimation noise (c or h in FIG. 3). The known power component (d or i FIG. 3) is subtracted from the estimated power, resulting in a normalized power estimate (e or j in FIG. 3). These normalized power estimates are used to track the underlying common variable C(t). The estimate of this variable is the output of the tracking (variable k in FIG. 3). To obtain the corresponding tracked received power values (n and q in FIG. 3), the normalization is reversed by adding the known power offset (l and p in FIG. 3).

Note that the transmitter may transmit different kinds of signals at different times or frequencies. For example, in LTE, a UE may transmit data (e.g., PUSCH) or reference signals (e.g., SRS) at different times, according to a schedule that is implicitly or explicitly communicated to the UE by the base station. At some times, the transmitter may transmit no signal at all. Therefore, the inputs to the tracking unit (e.g. c, e, h, j in FIG. 3) may be provided only at certain times, when a received power estimate and its corresponding estimation error properties become available. The tracking unit may collect these different inputs over a window of time, e.g., multiple subframes (e.g., 10 or 100 subframes), that are provided at different times and with different error properties into the output estimate. This estimate may be used to predict the received power of an upcoming transmission (e.g. q in FIG. 3), by adding the known power offset for this kind of signal (p in FIG. 3).

Returning to the LTE example discussed previously, a specific example is now discussed for illustration only. Two different kinds of signals are considered (M=2), with m=1 corresponding to PUSCH and m=2 corresponding to SRS.

Assume that a UE transmits both PUSCH and SRS during a subframe t for a cell c. The received power of the PUSCH in subframe t is estimated as $\hat{P}_{1,c}^{Rx}(t)$ and the received power of the SRS is estimated as $\hat{P}_{2,c}^{Rx}(t)$. The normalized powers are computed as $$\overline{P}_{1,c}^{Rx}(t) = \hat{P}_{1,c}^{Rx}(t) - P_{1,c}^{known}(t) = \alpha_c PL_c - PL_c^{UL}(t) + n_1(t) = C(t) + n_1(t) \quad \text{Eq. (15)}$$

$$\overline{P}_{2,c}^{Rx}(t) = \hat{P}_{2,c}^{Rx}(t) - P_{2,c}^{known}(t) = \alpha_c PL_c - PL_c^{UL}(t) + n_2(t) = C(t) + n_2(t) \quad \text{Eq. (16)}$$

Note that without the estimation errors $n_1(t)$ and $n_2(t)$, $\overline{P}_{1,c}^{Rx}(t)$ equals $\overline{P}_{2,c}^{Rx}(t)$. These normalized estimated powers, as well as the estimated error properties are input the function that tracks the slowly changing variable $C(t) = \alpha_c PL_c - PL_c^{UL}(t)$. The more signal observations that can be input to this tracking, the better accuracy of the output $\hat{C}(t)$.

The received powers can be estimated by renormalizing, as $$\tilde{P}_{1,c}^{Rx}(t) = \hat{C}(t) + P_{1,c}^{known}(t) \quad \text{Eq. (17)}$$

$$\tilde{P}_{2,c}^{Rx}(t) = \hat{C}(t) + P_{2,c}^{known}(t) \quad \text{Eq. (18)}$$

In a situation where the transmitter transmits no signal in subframe t, there is no input to the tracking function at this time. Under this situation, the tracking function can still provide a new updated estimate $\hat{C}(t)$, which can be used to estimate $\tilde{P}_{1,c}^{Rx}(t)$ and $\tilde{P}_{2,c}^{Rx}(t)$. Because of the identified commonalities between different signal pathlosses, it may be possible to refine received power estimate of a first signal, based on the reception of a second signal, even in the absence of a reception of the first signal when the estimation is refined.

In a situation where the transmitter transmits a SRS signal during subframe t, the received power estimate based on this signal, $\hat{P}_{2,c}^{Rx}(t)$, is input to the tracking function, as well as the estimated error properties. The tracking function can provide a prediction of the received PUSCH power during a future subframe t+4 based on $\hat{C}(t+4)$. The predicted received PUSCH power is computed as $\tilde{P}_{1,c}^{Rx}(t+4) = \hat{C}(t+4) + P_{1,c}^{known}(t+4)$. Here, it is assumed that the known PUSCH power offset for subframe t+4 is known (or assumed) at subframe t. This power offset may include a closed loop power control and the PUSCH bandwidth. PUSCH received power prediction could be useful in uplink scheduling, where the scheduling grant is sent to the UE in advance. Therefore, in some embodiments, the power level of a signal transmission may be predicted in advance, based on an estimated received signal power of a different signal.

Figure 4:
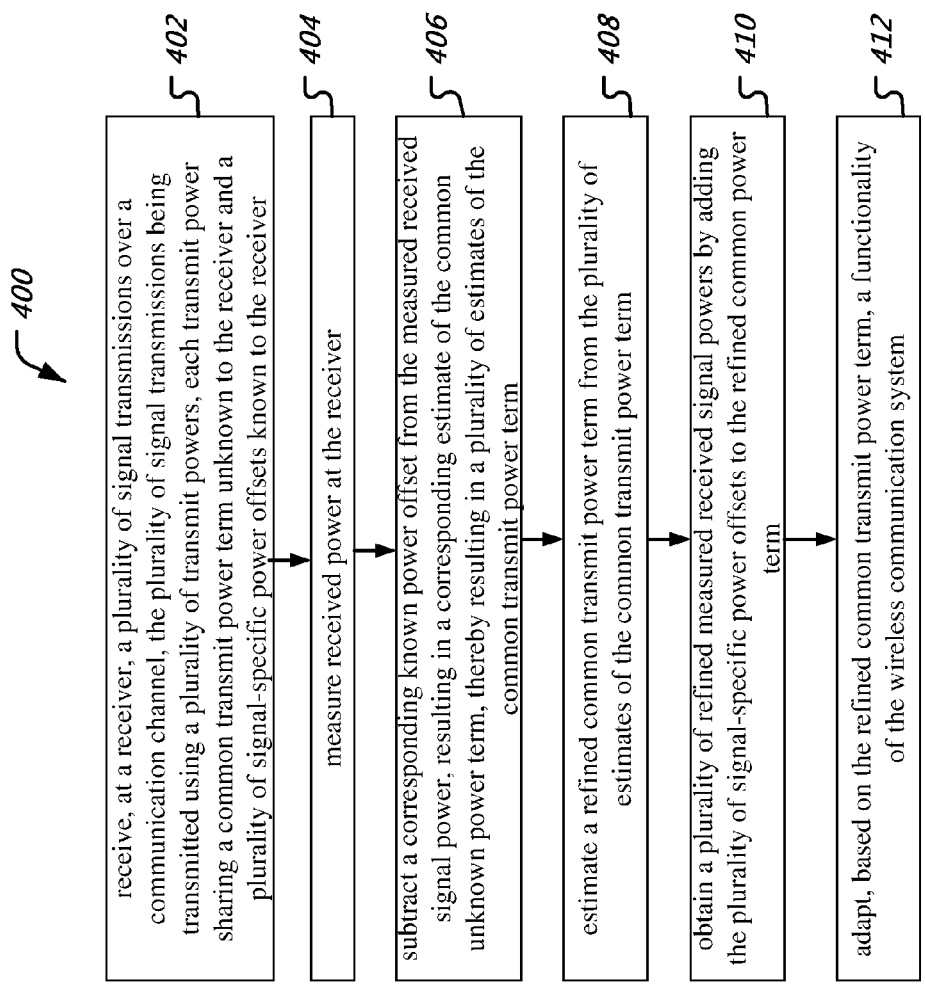
FIG. 4 is a flow chart representation of a process for wireless communications.

FIG. 4 depicts an example of a flow chart representation of a process 400 implementable in a wireless communication system. In various configurations, the process 400 may be implemented at a receiver-side such as a base station or a user equipment, or both.

At 402, a plurality of signal transmissions over a communication channel are received at a receiver. In some implementations, the plurality of signal transmissions are transmitted using a plurality of transmit powers. Each transmit power is a combination of a common transmit power term (value) unknown to the receiver and a plurality of signal-specific power offsets known to the receiver.

In various configurations, e.g., the above-discussed various reference signals, the plurality signal transmissions may use different frequency resources (e.g., different subcarriers of an OFDM system). In some configurations, the plurality of signal transmissions may use different time resources, such as different time slots in a time domain duplexed (TDD) wireless transmission system.

As previously discussed in the examples, the plurality of transmissions may include reference signals. The plurality of transmissions may also include data transmissions.

At 404, the receiver measures the received power. In various embodiments, received power is measured using one of various possible techniques (e.g., bandpass filtering, time averaging, integration, etc.).

At 406, a corresponding known power offset is subtracted from the measured received signal power, resulting in a corresponding estimate of the common unknown power term, thereby resulting in a plurality of estimates of the common transmit power term. As previously discussed, many wireless signals, e.g., PUSCH and SRS on LTE uplink, and physical downlink control channel (PDCCH) and common reference signal (CRS) on LTE downlink, have a known power level.

At 408, a refined common transmit power term is estimated from the plurality of estimates of the common transmit power term. In some configuration, the estimation of refined common transmit power term may be performed as previously described with respect to FIG. 3. The refined common estimate may be obtained using signal processing techniques such as Kalman filtering of the plurality of estimates. In some implementations, the refined common estimate is obtained by adaptively filtering the plurality of estimates.

At 410, a plurality of refined measured received signal powers are obtained by adding the plurality of signal-specific power offsets to the refined common power term. In some configuration, the refined measured received signal power may be obtained as previously described with respect to FIG. 3.

At 412, based on the refined common transmit power term, a functionality of the wireless communication system is adapting. In some implementations, the functionality may relate to a transmitter-side operational parameter such as future transmission schedule for transmissions from the transmitter. In some implementations, the functionality may relate to a receiver-side operational parameter such as adjusting gain control, improving channel estimation, calculating a desired signal constellation for transmissions from the transmitter and a desired channel coding rate for transmissions from the transmitter, and so on. In some implementations, the functionality of the wireless communication system may correspond to the transmitter sending a signal to the receiver to adapt the power of a subsequent transmission from the receiver to the transmitter.

In some implementations, the transmitter may be a network-side node such as a base station or an access point and the receiver may be a user equipment (smartphone, tablet, handheld computer, etc.). The user equipment may provide a feedback, sometimes called channel quality feedback, to the base station so that the base station can adapt future transmission schedule in the cellular system and also adapt transmission parameters to be used by the user equipment. Adaptation of these functionalities based on channel quality feedback may be performed using one of several techniques, including techniques currently used in the art.

In some implementations, the adapting comprises requesting, from the receiver to the transmitter, a change in a constellation, a coding rate or a transmit power of a subsequent transmission. In some implementations, the receiver is at a network-side node in the wireless communication system and wherein the operation of adapting comprises adapting power of a subsequent transmission to the receiver or adapting transmission schedule for signal transmissions to the receiver.

Figure 5:
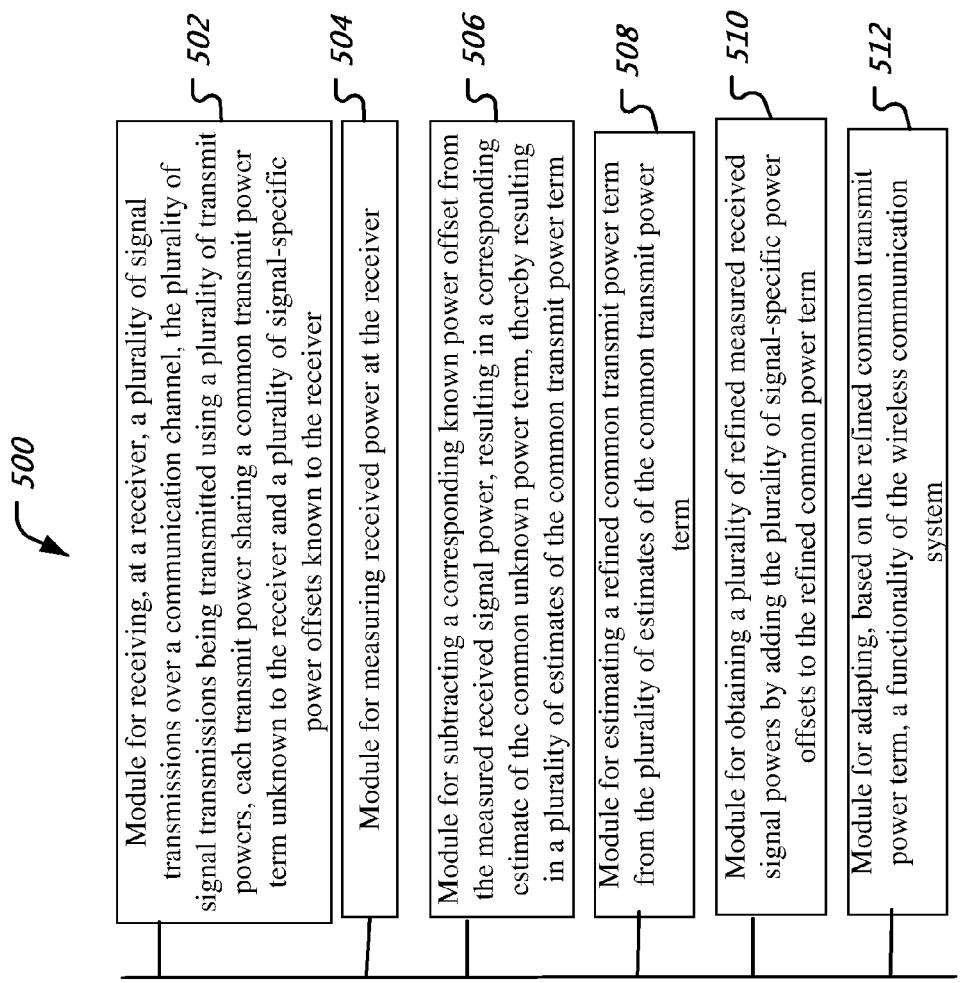
FIG. 5 is a block diagram representation of a wireless network apparatus.
Like reference symbols in the various drawings indicate like elements.

FIG. 5 is an example of a block diagram representation of an apparatus 500 for wireless communications. The module 502 is for receiving, at a receiver, a plurality of signal transmissions over a communication channel, the plurality of signal transmissions being transmitted using a plurality of transmit powers, each transmit power sharing a common transmit power term unknown to the receiver and a plurality of signal-specific power offsets known to the receiver. The module 504 is for measuring received power at the receiver. The module 506 is for subtracting a corresponding known power offset from the measured received signal power, resulting in a corresponding estimate of the common unknown power term, thereby resulting in a plurality of estimates of the common transmit power term. The module 508 is for estimating a refined common transmit power term from the plurality of estimates of the common transmit power term. The module 510 is for obtaining a plurality of refined measured received signal powers by adding the plurality of signal-specific power offsets to the refined common power term. The module 512 is for adapting, based on the refined common transmit power term, a functionality of the wireless communication system. The apparatus 500 and modules 502, 504, 506, 508, 510 and 512 may further be configured to implement various functions disclosed in this document.

The techniques disclosed in this document can be embodied in a network-side node, such as a base station, or a user-side device, such as a smartphone, a tablet, a computer, and so on. In some implementations, the network-side node may include a plurality of antennas and a plurality of corresponding receivers. Further, a subset of the plurality of antennas may be non co-located. In some of these implementations, the receiver-side functions disclosed in this document may use a first subset of the plurality of antennas to receive signals. The estimated power, as described above, may then be used to select a second subset of the plurality of receiver antennas a subsequent transmission should be received with. In some implementations, the second subset of antennas may be the same as the first subset of antennas. In some implementations, antennas may be added to or taken out of the first plurality to create the second plurality of antennas.

In some implementations, the estimated power, as described above, may be used to select from which subset of antennas a subsequent transmission should be transmitted.

One of skill in the relevant art will appreciate that the disclosed power measurement techniques allow for parameterization of measured power into a known component, that is common to the received different signal transmission types and an unknown component that is signal-specific. An estimate of the known, common component, is performed using the received signal, to improve the overall received power estimate.

One of skill in the relevant art will further appreciate that techniques for tracking received power estimates for a variety of signal transmissions are disclosed. In one disclosed aspect, the received power for a first signal is tracked.

The disclosed and other embodiments, modules and the functional operations (e.g., a power measurer, a subtractor, an estimator, a refined power calculator, an adapter, a receiver, etc.) described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method implementable in a wireless communication system, comprising:
   receiving, at a receiver that is implemented at least partially in hardware, a plurality of signal transmissions over a communication channel, the plurality of signal transmissions being transmitted using a plurality of transmit powers, each transmit power sharing a common transmit power term unknown to the receiver and a plurality of signal-specific power offsets known to the receiver;
   measuring received power at the receiver;
   subtracting a corresponding known power offset from the measured received signal power, resulting in a corresponding estimate of the common unknown power term, thereby resulting in a plurality of estimates of the common transmit power term;
   estimating a refined common transmit power term from the plurality of estimates of the common transmit power term;
   obtaining a plurality of refined measured received signal powers by adding the plurality of signal-specific power offsets to the refined common power term; and
   adapting, based on the refined common transmit power term, a functionality of the wireless communication system.

2. The method recited in claim 1, wherein the plurality of signal transmissions use different frequency resources.

3. The method of claim 1, wherein the plurality of signal transmissions use different time resources.

4. The method recited in claim 1, wherein the functionality of the wireless communication system includes a signal constellation and a channel coding rate used for a subsequent signal transmission from the receiver.

5. The method recited in claim 4, wherein the receiver is at a network-side node in the wireless communication system and wherein the operation of adapting further comprises:
   adapting power of the subsequent signal transmission from the receiver.

6. The method recited in claim 1, wherein the receiver is at a network-side node in the wireless communication system and wherein the operation of adapting comprises:
   adapting transmission schedule for signal transmissions from the receiver.

7. The method recited in claim 1, wherein the receiver is at a user equipment in the wireless communication system and wherein the operation of adapting comprises:
   providing a channel quality report to a network-side node.

8. The method recited in claim 1, wherein the receiver is at a user equipment in the wireless communication system and wherein the operation of adapting comprises:
   adjusting power of a subsequent transmission from the user equipment.

9. The method recited in claim 1, wherein the receiver is at a user equipment in the wireless communication system and wherein the operation of adapting comprises:
   providing a received power value to a network-side node.

10. The method recited in claim 1, wherein the estimating the refined common transmit power term includes performing a Kalman filtering operation on the plurality of estimates.

11. The method recited in claim 1, wherein the estimating the refined common transmit power term includes performing an adaptive filtering operation on the plurality of estimates.

12. The method recited in claim 1, wherein the plurality of signal transmissions include a data transmission and a reference signal transmission.

13. The method recited in claim 1, wherein the adapting comprises requesting, from the receiver to the transmitter, a change in a constellation, a coding rate or a transmit power of a subsequent transmission.

14. The method recited in claim 1, wherein the receiver is at a network-side node in the wireless communication system and wherein the operation of adapting comprises:
   adapting power of a subsequent transmission to the receiver.

15. The method recited in claim 1, wherein the receiver is at a network-side node in the wireless communication system and wherein the operation of adapting comprises:
   adapting transmission schedule for signal transmissions to the receiver.

16. A wireless communication apparatus operable in a wireless communication system, comprising:
   a receiver, is implemented at least partially in hardware, that receivers a plurality of signal transmissions over a communication channel, the plurality of signal transmissions being transmitted using a plurality of transmit powers, each transmit power sharing a common transmit power term unknown to the receiver and a plurality of signal-specific power offsets known to the receiver;
a power measurer that measures received power at the receiver;
a subtractor that subtracts a corresponding known power offset from the measured received signal power, resulting in a corresponding estimate of the common unknown power term, thereby resulting in a plurality of estimates of the common transmit power term;
an estimator that estimates a refined common transmit power term from the plurality of estimates of the common transmit power term;
a refined power calculator that obtains a plurality of refined measured received signal powers by adding the plurality of signal-specific power offsets to the refined common power term; and
an adapter that adapts, based on the refined common transmit power term, a functionality of the wireless communication system.

17. The wireless communication apparatus recited in claim 16 wherein the plurality of signal transmissions use different frequency resources.

18. The wireless communication apparatus of claim 16, wherein the plurality of signal transmissions use different time resources.

19. The wireless communication apparatus recited in claim 16, wherein the functionality of the wireless communication system includes a signal constellation and a channel coding rate used for a subsequent downlink signal transmission from the wireless communication apparatus.

20. The wireless communication apparatus recited in claim 16, wherein the receiver is at a network-side node in the wireless communication system and wherein the adapter further adapts power of the subsequent signal transmission from the receiver.

21. The wireless communication apparatus recited in claim 16, wherein the receiver is at a network-side node in the wireless communication system and wherein the adapter further adapts transmission schedule for signal transmissions from the receiver.

22. The wireless communication apparatus recited in claim 16, wherein the receiver is at a user equipment in the wireless communication system and wherein the adapter further provides a channel quality report to the wireless communication system.

23. A computer program product comprising a non-transitory computer-readable medium having code stored thereupon, the code, when executed by a processor, causing the processor to perform a method implementable in a wireless communication system, comprising:
receiving, at a receiver, a plurality of signal transmissions over a communication channel, the plurality of signal transmissions being transmitted using a plurality of transmit powers, each transmit power sharing a common transmit power term unknown to the receiver and a plurality of signal-specific power offsets known to the receiver;
measuring received power at the receiver;
subtracting a corresponding known power offset from the measured received signal power, resulting in a corresponding estimate of the common unknown power term, thereby resulting in a plurality of estimates of the common transmit power term;
estimating a refined common transmit power term from the plurality of estimates of the common transmit power term;
obtaining a plurality of refined measured received signal powers by adding the plurality of signal-specific power offsets to the refined common power term; and
adapting, based on the refined common transmit power term, a functionality of the wireless communication system.

24. The computer program product recited in claim 23, wherein the plurality of uplink signal transmissions use different frequency resources.

25. The computer program product recited in claim 23, wherein the downlink signal transmission parameter includes a signal constellation used for that downlink signal transmission.

26. The computer program product recited in claim 23, wherein the receiver is at a network-side node in the wireless communication system and wherein the operation of adapting comprises:
adapting signal constellation or signal power of a subsequent signal transmission from the receiver.

27. The computer program product recited in claim 23, wherein the receiver is at a network-side node in the wireless communication system and wherein the operation of adapting comprises:
adapting transmission schedule for signal transmissions from the receiver.

28. The computer program product recited in claim 23, wherein the receiver is at a user equipment in the wireless communication system and wherein the operation of adapting comprises:
providing a channel quality report to the wireless communication system.

29. A wireless communication system comprising a transmitter and a receiver, wherein:
the transmitter, implemented at least partially in hardware, is configured to transmit a plurality of wireless transmissions; and
the receiver is configured to:
receive the plurality of signal transmissions over a communication channel, the plurality of signal transmissions being transmitted using a plurality of transmit powers, each transmit power sharing a common transmit power term unknown to the receiver and a plurality of signal-specific power offsets known to the receiver;
measure received power at the receiver;
subtract a corresponding known power offset from the measured received signal power, resulting in a corresponding estimate of the common unknown power term, thereby resulting in a plurality of estimates of the common transmit power term;
estimate a refined common transmit power term from the plurality of estimates of the common transmit power term;
obtain a plurality of refined measured received signal powers by adding the plurality of signal-specific power offsets to the refined common power term; and
adapt based on the refined common transmit power term, a functionality of the wireless communication system.

* * * * *